United States Patent [19]

Roeder et al.

[11] 4,115,776
[45] Sep. 19, 1978

[54] ADAPTIVE GAIN CONTROL FOR RADIOMETRIC TARGET TRACKING SYSTEM

[75] Inventors: Robert S. Roeder, Dunedin, Fla.; Lucien C. Bomar, II, Marietta, Ga.

[73] Assignee: Sperry Rand Corporation, New York, N.Y.

[21] Appl. No.: 804,956

[22] Filed: Jun. 9, 1977

[51] Int. Cl.² .............................................. G01W 1/00
[52] U.S. Cl. ........................ 343/100 ME; 343/7 AG; 343/7.4; 343/117 R; 343/118
[58] Field of Search ............. 343/100 ME, 7 AG, 7.4, 343/117 R, 118

[56] References Cited

U.S. PATENT DOCUMENTS 3,883,876  5/1975  Roeder et al. .................... 343/117 R
3,921,169  11/1975  Lazarchick et al. ........... 343/100 ME Primary Examiner—Maynard R. Wilbur
Assistant Examiner—Richard E. Berger
Attorney, Agent, or Firm—Howard P. Terry

[57] ABSTRACT

The improved radiometric target seeking system incorporates automatic gain control features including phase tracking automatic gain and automatic gain scan amplitude controls in a system which is basically a dual-axis, gimballed, conical-scan radiometric sensor designed to operate in either active or passive modes and to provide angular line-of-sight rate steering signals to guidance control apparatus. Target-derived automatic gain control signals permit separation of desired stationary target signals from significant background clutter, and a unique adaptive processor minimizes degradation of tracking response and accuracy.

11 Claims, 10 Drawing Figures

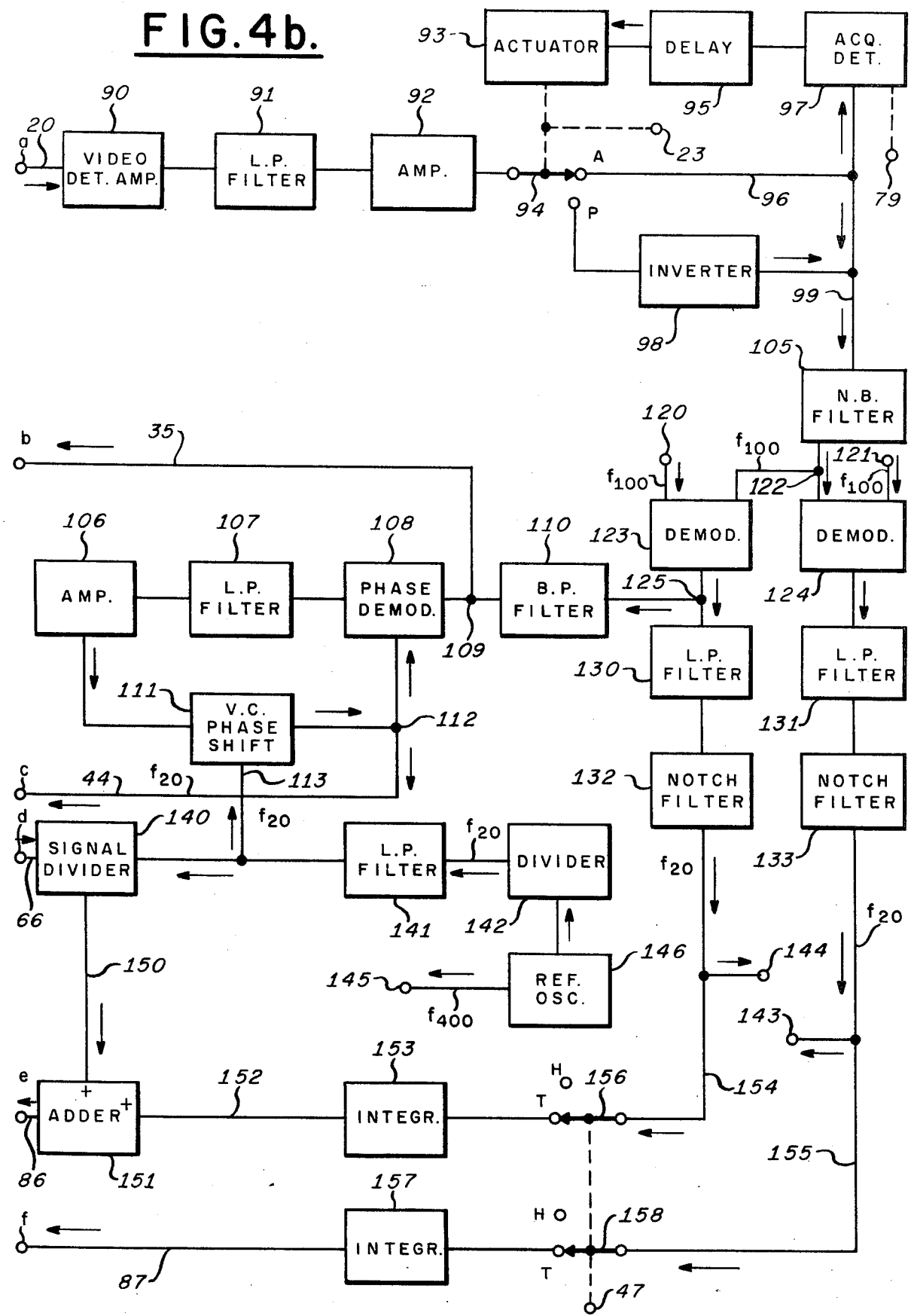

ADAPTIVE GAIN CONTROL FOR RADIOMETRIC TARGET TRACKING SYSTEM

BACKGROUND OF THE INVENTION

1. Field of the Invention

The invention pertains to the art of high frequency radiometry and to radiometric devices for seeking substantially stationary and other targets against the high background noise; it more particularly relates to radiometric devices adapted to recognize special characteristics of substantially point targets, both moving and stationary, even though immersed in such noisy environments, by the employment of novel adaptive automatic gain control arrangements for separating the desired target signals from such significant background noise.

2. Description of the Prior Art

Radiometric target searching and tracking systems are well known in the art and are so generally characterized, by the inherent nature of their operating environment, to be of specialized utility. For example, they have not generally been totally satisfactory for use in high noise level environments, as in detectiang small metal objects like fixed navigation markers or other metal objects such as parked vehicles in noisy environments. A typical example of prior dual-mode radiometric systems is that of the Lararchik et al U.S. Pat. No. 3,787,857 for a "Dual Mode Radiometric System", issued Jan. 22, 1974 and assigned to Sperry Rand Corporation. The Lazarchik et al system features selective operation in a passive mode or in an active mode, as does the present invention, the active mode providing a mechanism for the deliberate illumination of the selected target for improving the detected radiometric temperature contrast between the target and its spatial background and thereby for increasing the range at which such a target may first be detected.

There are basic problems associated with such radiometric systems when employed in searching, acquiring, and automatically tracking relatively small metal objects such as trucks or other vehicles whose high frequency energy-radiating properties generally vary over a wide range. In particular, the targets involved are often small with respect to the angular region subtended by the circularly symmetric antenna receptivity pattern. For example, at the normal acquisition range between the target and the radiometric system, target size may easily be an order of magnitude smaller than the cross section of the antenna receptivity pattern where the latter intercepts the earth. If the noise from the background surrounding the target were ideally homogeneous and constant, it would be possible to detect even a point target; but the background inherently fluctuates. Such wide fluctuations have a relatively low frequency spectrum and additionally tend to mask the signals from small targets and to make their detection difficult.

Thus, a major problem element for any air-to-ground active-passive radiometric tracking system in which antenna aperture size is constrained is that the received signal from a target is small in relation to the unwanted background signals especially at maximum detection and tracking slant ranges. This is understood in part from FIGS. 1 and 2 that show the received power in an active mode at radiometer 6 as a function of conical scan beam position 1, 2, 3, or 4. As noted, the power received from the background is present throughout all beam positions and is significant with respect to the power from a target 5 appearing at beam position 3. The tracking system must be able to separate both stationary and moving target signals from the background clutter and to provide steering signals that are true indications of angular pointing error. FIG. 3 illustrates the typical received power contributions from the background and target 5 as a function of range for a 35 GHz active mode seeker with a five inch diameter antenna. As will be noted, at a range of 5,000 feet or greater, the received background power is at least ten times greater than the received target power. At a range of 1,500 feet, the received powers from the two sources become equal; at less than 1,500 feet, the target power exceeds the background power. The automatic gain control system for the tracker must be capable of separating the target power from the background power and must prevent receiver saturation with increasing signal levels. In addition, the gain control must preserve a substantially fixed scale factor between percent modulation at the conical scan frequency and angular error, independent of received signal strength. If this is not done, loop gain of the tracking system increases as the craft descends and the tracking system becomes unstable and will probably lose the target.

There are, of course, gain control methods available in the fully active radar sytem art, but these are generally not adaptable to the active-passive radiometer tracker for several reasons; for example, range and gain control gating systems cannot operate without the synchronized type of operation characteristic of the active mode inherent in radar systems. Furthermore, target discriminating radar systems based on Doppler processing may evidently not be employed with any success with substantially motionless targets.

SUMMARY OF THE INVENTION

The invention is a dual-mode, active-passive radiometric system for automatically searching, acquiring, and tracking small metal objects, either moving or stationary, located on terrain normally characterized as a non-homogeneous and energetic emitter of noise signals. The invention provides improvement in the operation of dual-mode conical and search scan radiometer sensors selectively adapted for active and passive operation. In the active mode, the target area is illuminated by continuous-wave frequency-modulated high frequency energy. The improvement of the present invention incorporates adaptive automatic gain control features including phase tracking automatic gain and automatic gain scan amplitude controls. The adaptive gain control systems provides separation from severe background noise of the desired target signals even for stationary targets. Thus, the invention features an improved adaptive automatic gain control system processing target-derived signals for efficiently separating stationary as well as moving target signals from excessive background clutter.

BRIEF DESCRIPTION OF THE DRAWINGS

FIGS. 4A and 4B are block diagrams of the invention showing its electrical components and their interconnections.

DESCRIPTION OF THE PREFERRED EMBODIMENTS

Figure 1:
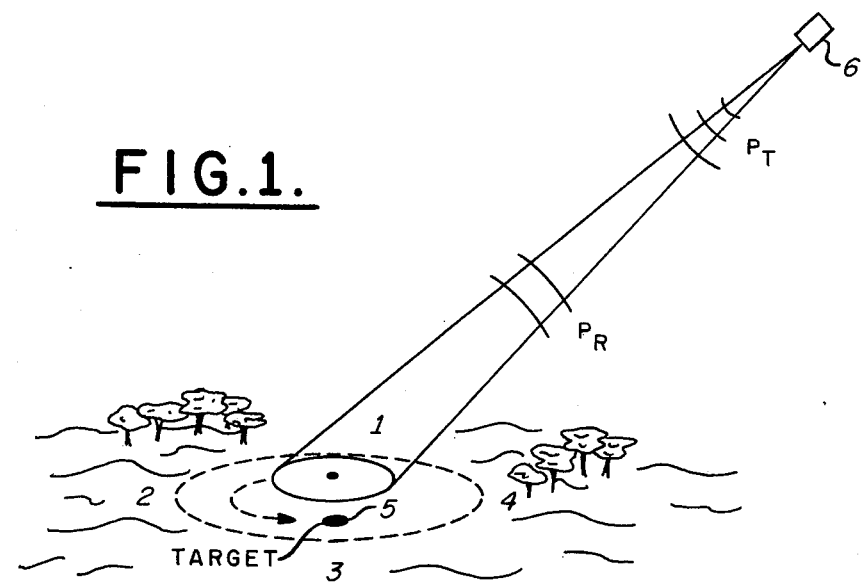
FIG. 1 is a perspective view showing a typical environment in which the invention may be employed.
Figure 2:
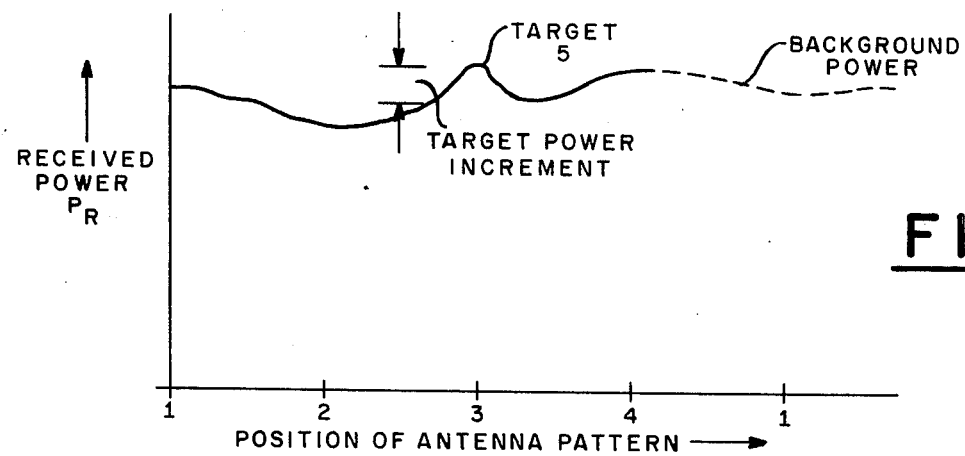
FIGS. 2 and 3 are graphs useful in explaining operation of the invention.
Figure 3:
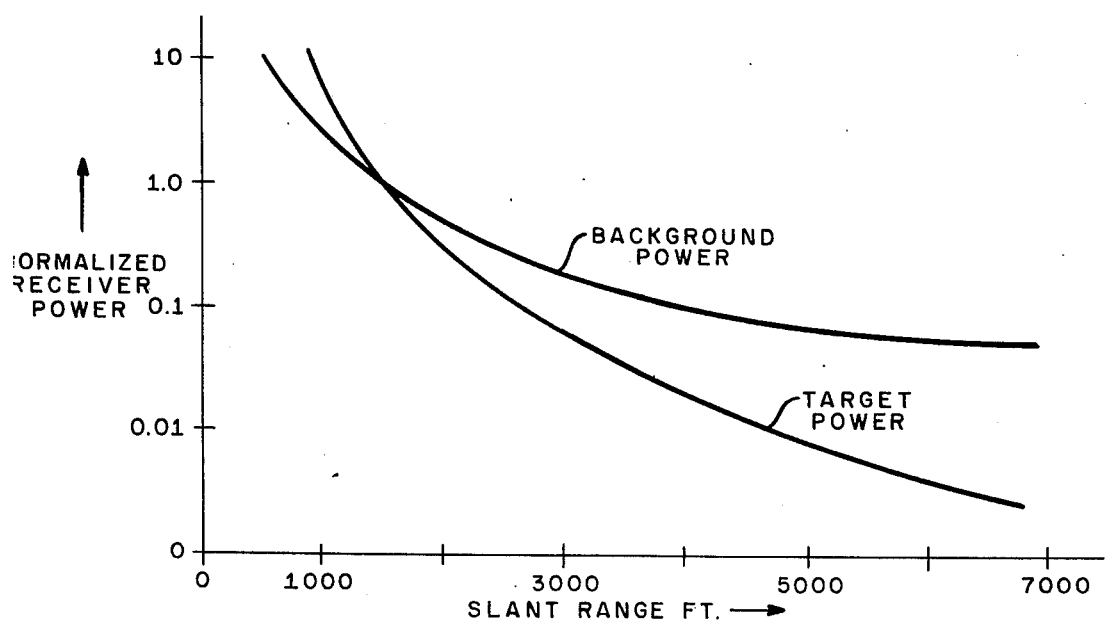
Figure 4A:
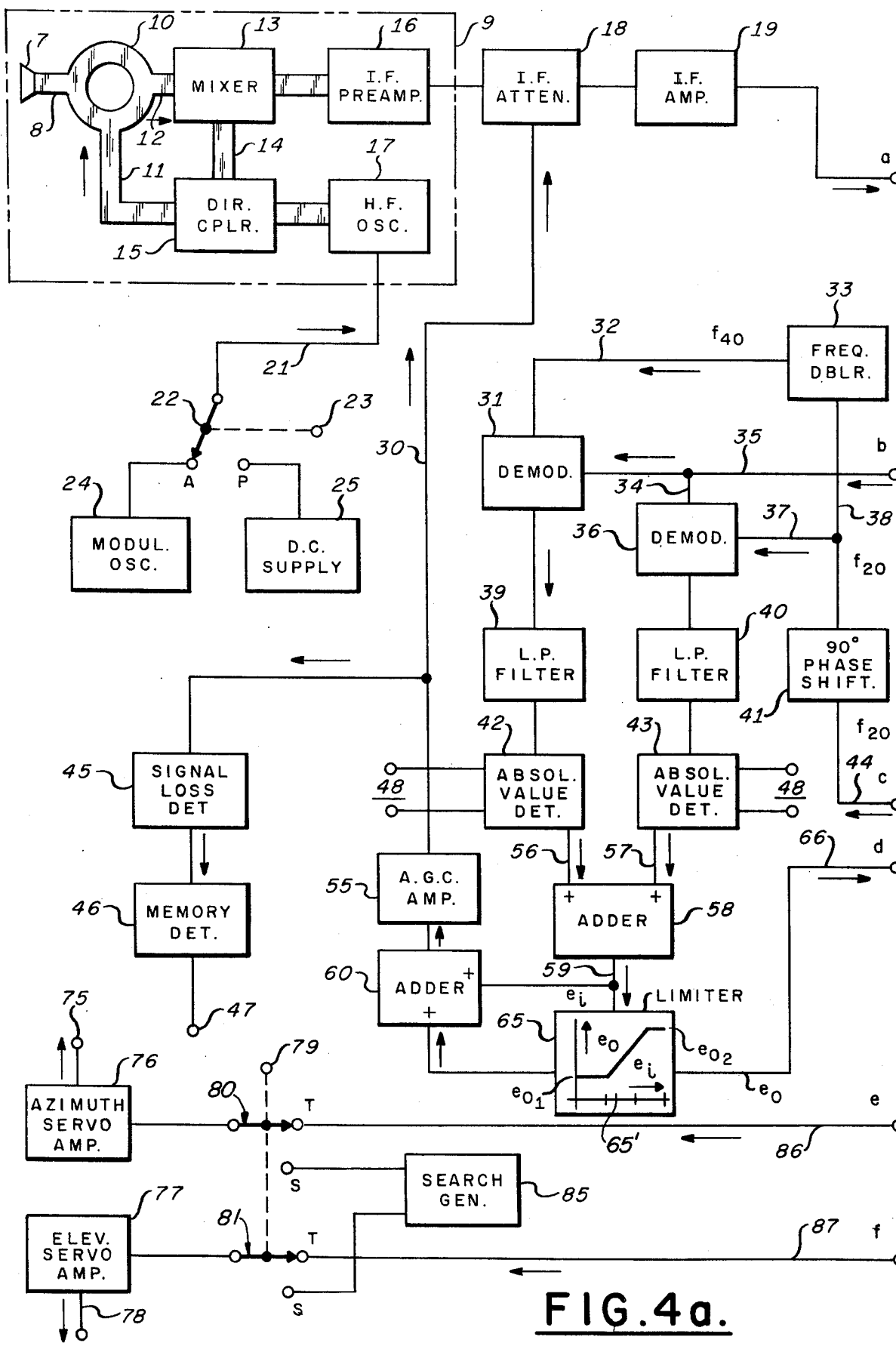

The invention as disclosed in FIGS. 4A and 4B has, in the general event, two basic functions to perform. The seeker must first search and detect the presence of a point target within the antenna pattern. Secondly, the seeker must switch to a closed-loop tracking mode of operation to maintain the target within the antenna field of view. It may also then in certain applications provide line of sight steering commands to a craft guidance control system. It will be seen that the antenna employed in the invention may be of generally conventional nature, being of the kind that is known in the prior art for selective searching and tracking, therefore making any detailed description of the physical structure of the antenna unnecessary herein except to make clear how it cooperates with novel parts of the invention. The antenna drive and gimbal support system may be of the general type disclosed, for instance, in the L. A. Maybarduk et al U.S. Pat. No. 2,410,831, issued Nov. 12, 1946 for a "Scanning Device" and assigned to Sperry Rand Corporation. In particular, the antenna system may use features of the scanning antenna of the W. W. Hansen U.S. Pat. No. 2,571,129 for a "Scanning Antenna Device", issued Oct. 16, 1951 and of the related scanning system of the R. V. Gould U.S. Pat. No. 3,226,721 for a "Scanning Antenna Utilizing Four Rotary Prisms to Produce Rectilinear Scan and Fifth Rotary Prism to Produce Conical Scan", issued Dec. 28, 1965, both patents being assigned to Sperry Rand Corporation.

Figure 5:
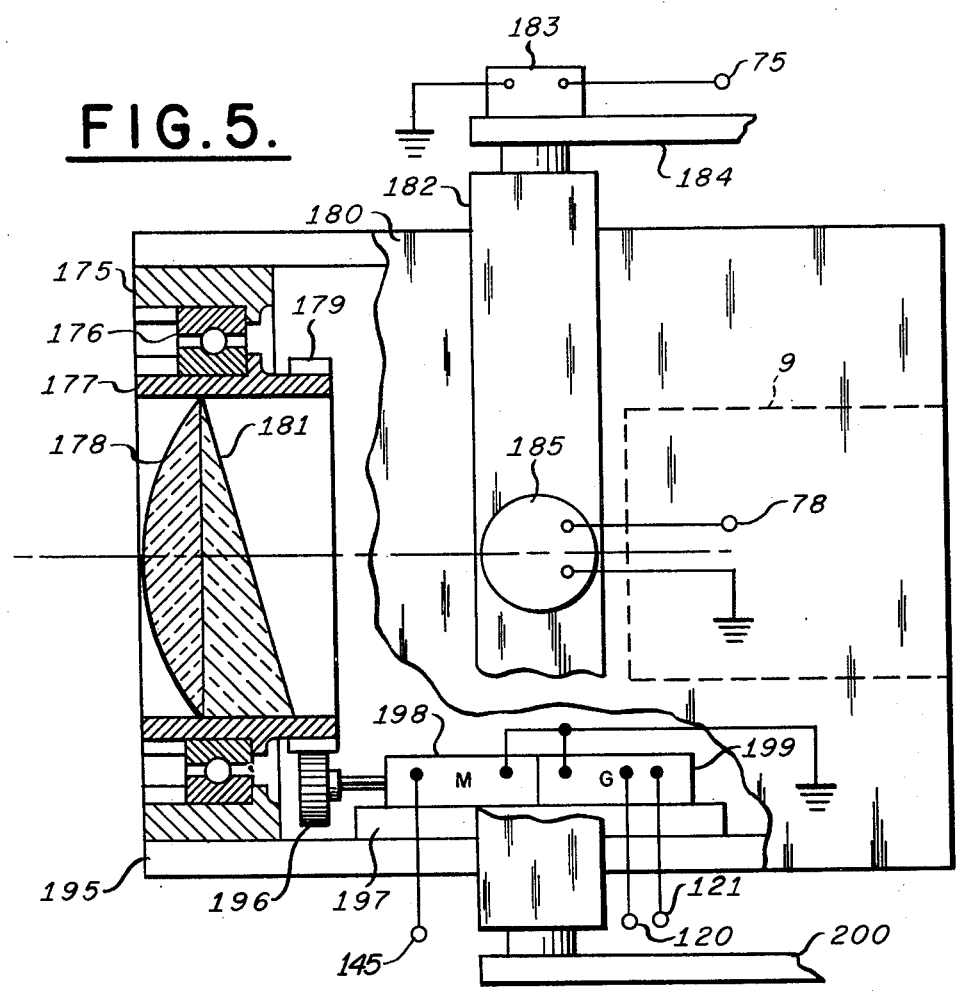
FIG. 5 is an elevation view of partial cross section illustrating an antenna useful in the apparatus of FIG. 4A.

The transmitter-receiver of FIGS. 4A and 5 is shown as including a typical antenna with a wave guide 8 and an associated horn 7 for both reception and transmission. Lens 178 (FIG. 5) serves to collimate the antenna pattern, while prism 181 cyclically deflects it when prism 181 is rotated, so that conical scan is effected. The dielectric lens 178 is conveniently mounted in the same rotatable circular frame 177 as is prism 181, frame 177 being journalled in a bearing 176 in the frontal member 175 forming part of enclosure 180. Rotation of prism 181 and conical scan of the antenna pattern is effected when synchronous motor 198, which may include step-up gearing, drives rotatable frame 177 through gearing 179, 196. Rotation of the antenna pattern about a direction one half of a pattern-width off bore-sight produces the conventional conical scan modulation of the received energy necessary to provide closed-loop automatic tracking. A two-phase generator 199 is connected to the shaft of motor 198 so that two quadrature signals are generated that are synchronized to the antenna conical scan and that can be used as reference signals to demodulate the received signal. They appear at terminals 120, 121, while the driving voltage for motor 198 is applied at terminal 145. Motor 198 and generator 199 are located on a common base 197 on the platform floor 195 of enclosure 180.

The antenna, including the transmitter-receiver device 9 and refractor elements 178, 181, is mounted within a convenient enclosure 180 and is supported in a gimbal system from the craft frame, as at 184 and 200. The support includes a gimbal 182 mounted for rotation about a normally vertical axis, its azimuth position being determined by servo motor 183 fed at terminal 75 by a suitable control signal generated as will be explained. Housing 180 is journalled about a normally horizontal axis within gimbal 182, its position being determined by servo motor 185 according to control signals applied at terminal 78, as will be further explained.

FIGS. 4A and 4B illustrate in further detail how the novel adaptive target-derived automatic gain control is advantageously incorporated in a continuous-wave frequency modulated dual-mode target sensor or seeker 6. The seeker system 6 includes a continuous-wave transmitter employing a high frequency oscillator 17 for feeding electromagnetic energy though antenna horn 7 and lens 178 toward a remote vista in which a target 5 may appear. Transmitter oscillator 17 is continuously frequency modulated when its voltage controlling lead 21 is coupled by switch 22 through active mode contact A to modulation oscillator 24. High frequency oscillator 17 may be a conventional 35 GHz low-power electronically-turnable Gunn oscillator modulated over a radio frequency band of about 1200 MHz, for example, with a power output of 100 milliwatts. The transmitter power is fed through a directional coupler 15 to one port 11 of the three-port circulator 10, is circulated in a clockwise direction to port 8, and is subsequently radiated continuously through antenna horn 7. Any transmitted energy reflected from the target 5 back to the sensor is received through antenna horn 7 and is circulated clockwise through circulator 10 to the input port 12 of mixer 13. A small portion of the transmitter signal is applied through directional coupler 15 to the local oscillator input 14 of the mixer 13. The received and transmit signals are thus mixed and the difference frequency appears as an intermediate frequency at an input of i.f. preamplifier 16 having a pass band of 50 to 100 MHz, for example.

The mixer 13 output is amplified in the i.f. preamplifier 16 and is fed to i.f. voltage controlled attenuator 18 which is used for gain control in the automatic gain control loop. The gain controlled stage is located at this point to provide sufficient dynamic range in the i.f. signals, thus eliminating any saturation effects that might occur primarily due to strong returns at short target ranges. The i.f. attenuator 18 provides a total attenuation of 80 dB, for example. This stage is followed by a final i.f. amplifier 19 which raises the i.f. signal level to a suitable value for detection at the video detector 90 (FIG. 4B). The low level video signal is thus amplified and is connected to a low pass filter 91 for passing 400 Hz signals, followed by a second video amplifier 92.

The output of the video amplifier 92 is switched into one of two channels depending on whether the sensor is operating in the active A or in the passive P mode. In the active mode, the output of the video amplifier 92 is applied through switch 94 to the active switch contact A and is therefore coupled by leads 96, 99 to narrow band filter 105. The position of switch 94 is controlled through mechanical or other link 23 by actuator 93, as will be explained. Actuator 93 and link 23 also control the position of switch 22 in FIG. 4A. In the passive mode of the system, link 23 causes switch 22 to move to the passive contact P, feeding a constant amplitude unidirectional voltage to high frequency transmitter oscillator 17 from d.c. supply 25. Likewise, in the passive mode P of the radiometer system, the video output of amplifier 92 is coupled by switch 94 and link 23 to the passive switch contact P. The output of amplifier 92 then passes through the inverting amplifier 98 before reaching narrow band filter 105. The inversion is required since the phase relationship of the target response is inverted. Also, the inverting amplifier 98 provides additional gain to correct for the loss in loop gain due to the one way charateristic of natural target radiation. In the active mode, the received energy is always greater because the target 5 is illuminated.

The sensor normally begins its operation in the active search mode. The output of the video amplifier 92 is processed by the acquistion detector 97. In the active search mode, transmitter oscillator 17 is being frequency modulated and the antenna is being scanned in its azimuth and elevation search pattern by signals fed from search generator 85 to the respective azimuth and elevation antenna servos 76, 77. When a target is detected, the output of acquisition detector 97, through mechanical or other link 79, causes switch blades 80, 81 (FIG. 4A) to move upward from the respective search contacts S,S to the respective track contacts T,T, thereby coupling via leads 86, 87 appropriate tracking error signals through amplifiers 76, 77 to terminals 75, 78 of the azimuth antenna servo motor 183 and the elevation antenna servo motor 185. When the presence of a target is actually sensed by the acquisition detector 97, which in a simple form may be a conventional threshold detector, the system is switched by link 79 from the search mode to the tracking mode. In addition, time delay 95 receives an initiation command. The predetermined delay setting is based on the release altitude and descent rate of the craft and provides the command to transfer the seeker into the passive mode at the appropriate time.

The video signal from video amplifier 92 (or inverting amplifier 98 for passive operation) is filtered by narrow band filter 105, which may be a filter passing signals at 100 Hz. This removes any unwanted higher harmonic components generated by the conical scan of the antenna pattern and increases the video signal-to-noise ratio. For a point target located near the boresight as applies during closed-loop tracking, the video response is predominantly 100 Hz for the example being cited. The output of narrow band filter 105 is fed in a conventional method via junction 122 to quadrature demodulators 123, 124. These demodulators are synchronized with respect to the antenna conical scan rate by virtue of quadrature reference sine wave signals coupled at terminals 120 and 121 of the conical scan spin reference generator 199 (FIG. 5). The action of the demodulators 123, 124 is to extract the target modulation signal with respect to each axis. The modulation components of the video signal are directly proportional in amplitude to the angular displacement of target 5 from the conical scan axis of rotation. The demodulated signals are subjected to low pass filters 130, 131 to remove the ripple from the error voltage; the outputs of these parallel filters 130, 131 are instantaneous azimuth and elevation line of sight error rates during closed-loop tracking. The outputs of the low pass filters 130, 131 are then fed into two notch filters 132, 133. The two filters 132, 133 which may be centered at 20 Hz, are used to remove any remaining 20 Hz modulation induced by the automatic gain control scan from contaminating the target error signals, as will be further discussed.

The outputs of the notch filters 132, 133 on leads 154, 155 are respectively integrated by parallel integrators 153, 157 which convert the closed-loop line of sight rates into line of sight angular error signals. These error voltages are then fed to the respective gimbal servo amplifiers 76, 77 to reposition the antenna so as to reduce the angular line of sight error to zero. It will be readily understood by those skilled in the art that the feeding of the output of amplifier 92 through the dual channel phase detection system involving demodulators 123, 124 supplies phase-detected output signals representing azimuth and elevation tracking error signals in the general manner employed widely in automatic positional tracking radar systems and also in radiometric systems, for example, of the kind disclosed in the R. S. Roeder et al U.S. Pat. No. 3,883,876 for a "High Frequency Radiometric Target Seeking and Tracking Apparatus", issued May 13, 1975 and assigned to Sperry Rand Corporation; reference may also be had to the aforementioned Lazarchik et al U.S. Pat. No. 3,787,857. In the present invention, the outputs of notch filters 132, 133 at the respective terminals 144, 143 may be used for craft guidance purposes, if desired.

To obtain optimum closed-loop tracking of a target several factors and their interrelations must be considered. First, the tracking loop gain must be maintained within predetermined confines, such as within approximately ± 3 dB. However, the gain of the tracking loop is a function of range to the target, of the target cross section, and of the total round trip transmission losses which are in turn dependent upon weather conditions. Should the loop gain exceed the optimum setting, the tracking control loop easily becomes unstable, resulting in loss of the target. If the loop gain is too low, then the tracking loop becomes unresponsive and cannot reliably follow changes in the target line of sight. Variations in the seeker loop gain appear as variations in the output azimuth and elevation line of sight rate scale factors. These two outputs are used by the control system to provide guidance information to the craft control surfaces. Consequently, an automatic gain control having special properties and therefore features not known in the prior art is required.

Figure 6:
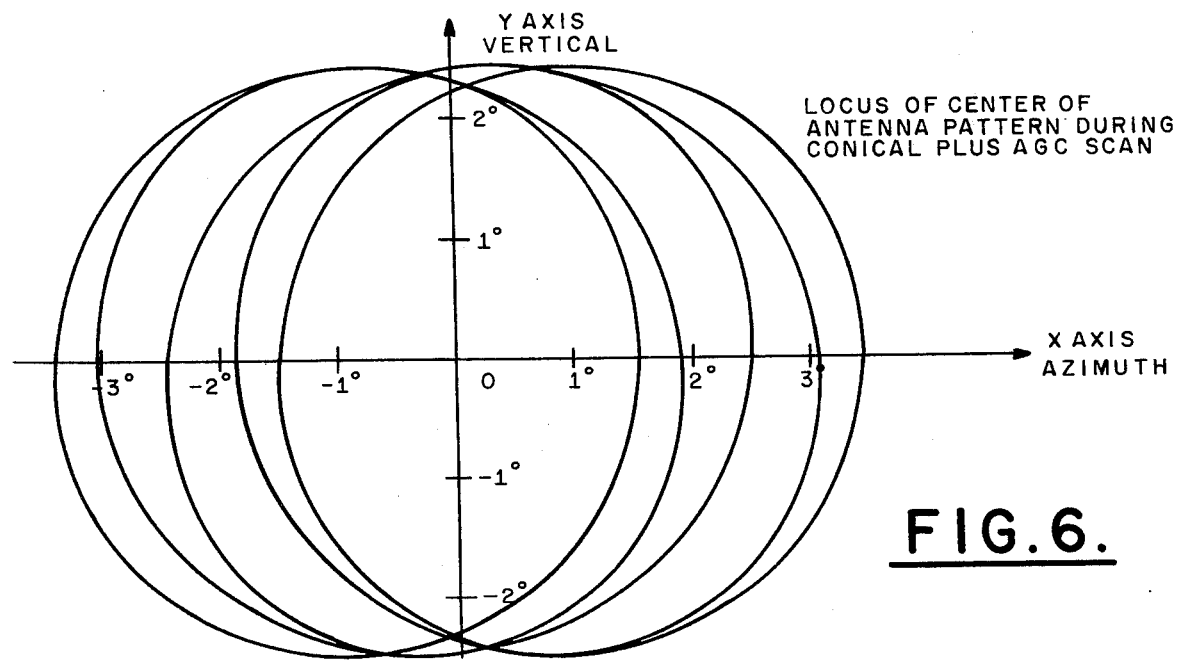
FIG. 6 is a diagram useful in explaining the operation of the antenna of FIG. 5.
Figure 7:
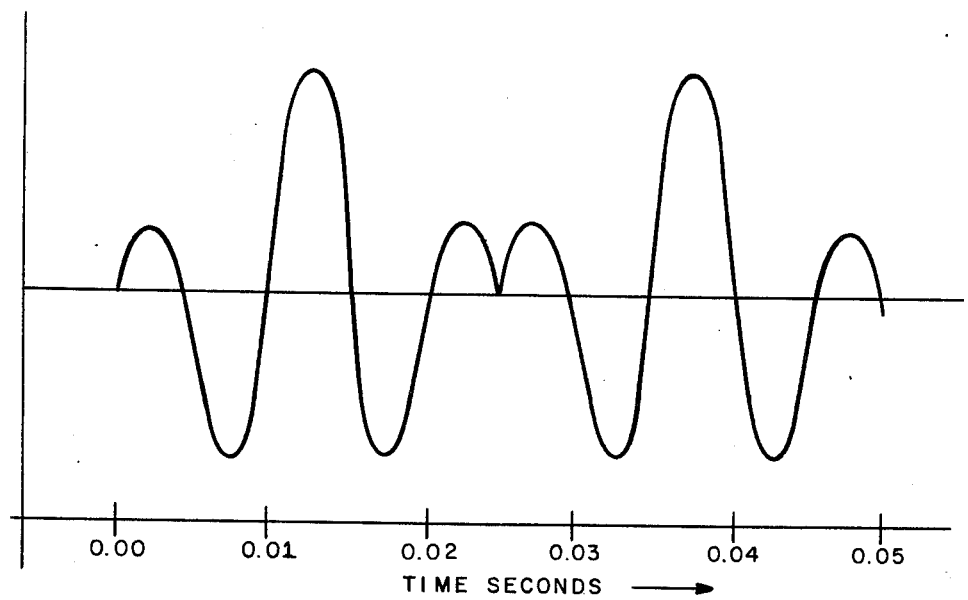
FIGS. 7, 8 and 9 illustrate signal wave forms and are useful in explaining the operation of the invention as illustrated in FIGS. 4A and 4B.

The novel adaptive target-derived automatic gain control shown in FIGS. 4A, 4B allows the loop gain to be set on the basis of the amplitude of the received return from a point target and corrects for changes in range, target cross section, transmission losses, and weather conditions. The information for establishing the gain in the tracking loop is generated by introducing a second, lower frequency scan modulation of the antenna position. This added gain control or scan modulation is accomplished by summing a small alternating signal in the azimuth channel signal adder 151 (FIG. 4B) at a 20 Hz frequency, adder 151 being coupled to integrator 153 by lead 152 and by lead 86 to azimuth servo amplifier 76. The antenna gimbal 182 (FIG. 5) is therefore additionally driven to execute a small angular azimuth scan at a subharmonic of the tracking conical scan frequency. The consequence is a small oscillating azimuth scan of the antenna boresight superimposed upon its conical scan motion, producing in effect a synchronous, dual-frequency azimuth-modulated conical scan of the antenna pattern. A typical path of the axis of the antenna pattern during the combined motion is shown for one cycle of the azimuth scan in FIG. 6. This composite motion inherently produces a composite modulation of the received video signal, an example of which is shown in FIG. 7, and which contains both tracking and gain control error information. The gain control error signal is picked off at the output of the 100 Hz (sine)

demodulator 123 at junction 125. The resulting open loop wave form for a scan across the target would be the wave form 220 of FIG. 9 which is the familiar conical scan error curve. The gain control error signal at junction 125 is coupled through filter 110 which has a pass band including 1 and 40 Hz, in particular so that it passes both 20 and 40 Hz signals and rejects any 200 Hz ripple. It will be understood that the resulting signal at junction 109 is largely the fundamental and second harmonic of the automatic gain control scan modulating voltage so that it may usefully be coupled by lead 35 to synchronous demodulators 31 and 36 which readily detect the respective gain control scan modulation components at 40 and 20 Hz.

The 40 Hz demodulator 31 is particularly employed for the case in which the target 5 is located substantially one-half the antenna pattern width off boresight, its output being coupled through low pass filter 39 to the conventional absolute value detector 42. Circuit 42 is supplied with positive and negative reference voltages on terminals 48 by a conventional power supply (not shown). The output of absolute value detector 42 appears on lead 56 and is coupled to the conventional adder circuit 58. The absolute value circuit 42 is a circuit adapted, in effect, for rectifying both polarities of a bipolar input signal so that a composite signal of only one predetermined polarity appears at its output for application to adder circuit 58. In a similar manner, the output of the 20 Hz demodulator 36 is coupled through low pass filter 40 to a second absolute value detector 43 similar to circuit 42 and also coupled to the reference voltage terminals 48 of the power supply associated with absolute value detector 42. The output of the detector 43 is fed by lead 57 as a second input to adder 58, the imputs 56, 57 to adder 58 being polarized as shown in the drawing.

Figure 9:
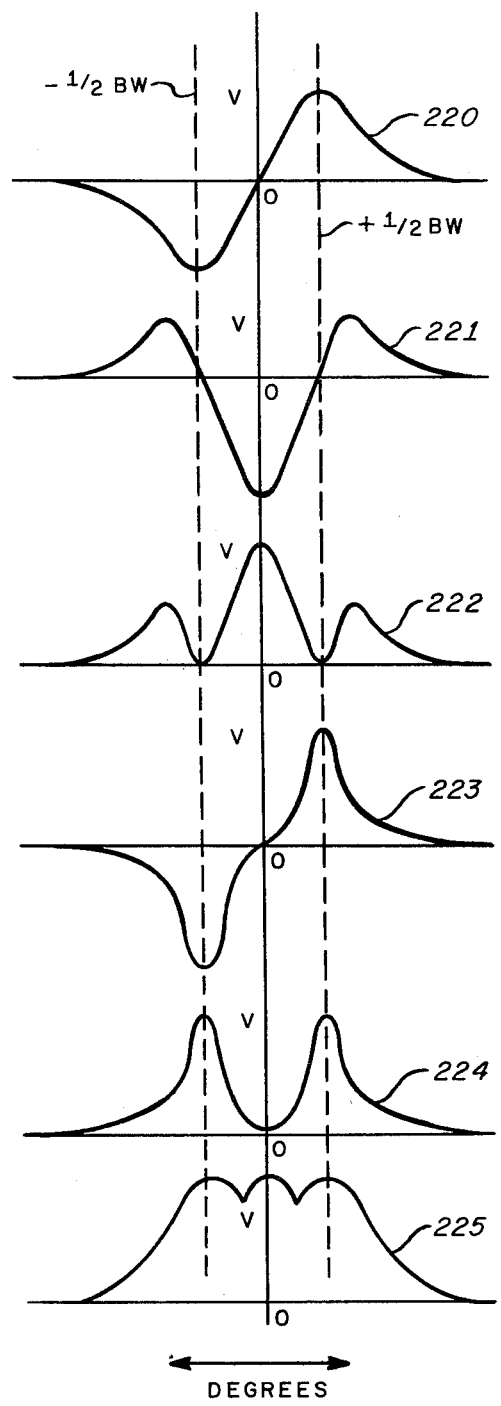

Wave form 221 of FIG. 9 illustrates the output of the 20 Hz demodulator 36 for an open-loop scan of the antenna pattern across target 5, and the triple-peaked single polarity wave form 222 of FIG. 9 is the consequent output of low pass filter 40 and absolute value detector 43 on lead 57. It is seen that the absolute value detector 43 is used to extract the gain control signal amplitude irrespective of phase. It is significant to note that the response drops to zero at $\pm \frac{1}{2}$ pattern width off the boresight direction. This is due to the high 40 Hz component of the gain control signal when the target is one half pattern width offset from the conical scan boresight. To use this latter modulation, the 40 Hz detector channel is employed. Likewise, FIG. 9 shows the output 223 of the 40 Hz demodulator for an open-loop scan across the target 5 and wave form 224 is the absolute value detector 42 output for the 40 Hz channel. Here, the peak of the response actually occurs at $\pm \frac{1}{2}$ pattern width and drops to zero at boresight. The two voltages from the respective absolute value detectors 42, 43 are scaled and are added so that the resulting output from the signal adder 58 appears as in wave 225 of FIG. 9. The response of the automatic gain control loop has thus been broadened from that of curve 222 so that no nulls or drop out regions occur and the system amplitude response is substantially uniform across the whole of the antenna conical scan field of view.

Figure 8:
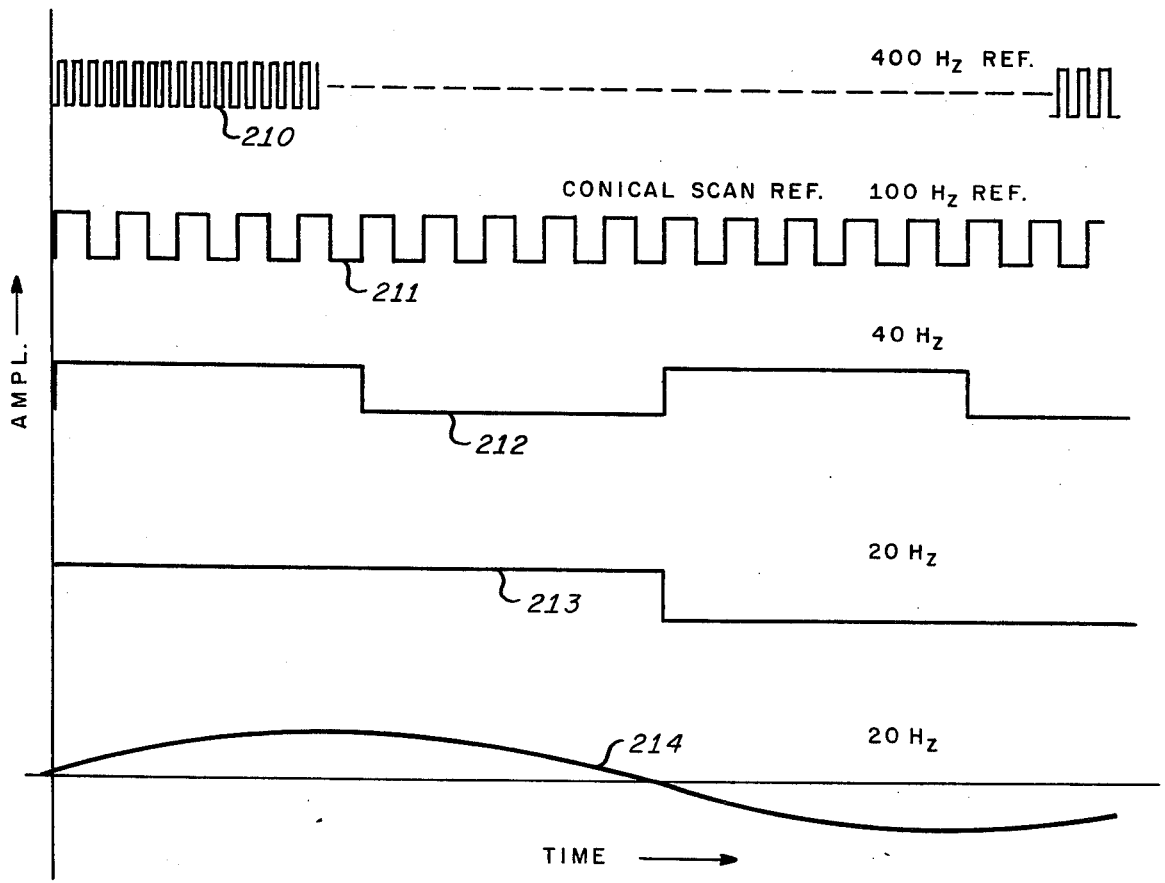

In the foregoing discussion, it has been assumed that suitable reference phases are available for demodulators 31, 36; the manner in which they are generated will now be developed. The reference phase voltages are generated for use with signals available at junction 125 and are passed by band pass filter 110 to a phase locked loop. For this purpose, reference or system clock oscillator 146 (400 Hz) supplies a driving signal (wave form 210 of FIG. 8) at terminal 145 for operating conical scan motor 198 (FIG. 5). At the same time, a synchronous output is coupled to divider 142 for the production therein of first a 40 Hz wave and then of a 20 Hz clock signal (wave forms 212, 213 of FIG. 8). After being processed by low pass filter 141, the reference sine wave voltage 214 takes two paths.

The filtered 20 Hz sine wave 214 on the branching lead 113 is seen to be synchronized in frequency, but not in phase, with respect to the automatic gain control modulation signal. To produce a suitable signal that is also phase locked, the output of band pass filter 110 is applied to the input of a phase comparator 108 which compares the phase of its input with the 20 Hz signal from voltage controlled phase shifter 111 and generates an error voltage that is related to the phase difference between those two signals. This error voltage is then filtered by low pass filter 107, is amplified (106), and is applied to the control terminal of the voltage controlled phase shifter 111. In this manner, the unidirectional control voltage output of amplifier 106 forces the phase shifter 111 to vary in a direction that reduces the phase difference between the output of phase shifter 111 and the gain control input signal at terminal 109 to zero. Consequently, the 20 Hz signal from phase shifter 111 is synchronized both in phase and in frequency after it passes through lead 44 and 90° phase shifter 41 (FIG. 4A) with the automatic gain control signal at junction 109. The resultant 20 Hz phase-locked signal is passed from junction 112 by leads 44 and 37 to demodulate the automatic gain signal on lead 34 in the 20 Hz demodulator 36. In addition, the branching lead 38 supplies the 90° phase-shifted signal as the 40 Hz phase-locked reference through frequency doubler 33 to an input 32 of the 40 Hz demodulator 31. In this manner, demodulators 31 and 36 are capable of operation as previously described.

The reference on system clock oscillator 146 has a further function in that its 20 Hz sine wave output is coupled, after passing through low pass filter 141, to one input of a voltage amplitude divider 140. A second input on lead 66 is a unidirectional voltage by which the amplitude of the alternating input is divided. The dividing signal on lead 66 is provided by a limiter 65 having the limiter characteristic 65' drawn on the face of the block representing limiter 65. The input to limiter 65 is supplied via lead 59 by the aforementioned adder 58. Signal divider 140 supplies the control signal via lead 150 needed to supply a second input to the adder 151 located serially between integrator 153 and azimuth antenna servo amplifier 76. The addition of the signals on leads 150 and 152 imposes the 20 Hz azimuth scan motion on the azimuth tracking motion demanded by the error signal on lead 152.

The output of the signal adder 58 is the desired automatic gain control signal. This output is applied as $e_i$ to limiter amplifier 65. The output of limiter 65 is a function of the input $e_i$ as shown at 65'. The output $e_o$ is fed back to signal divider 140. This voltage $e_o$ is the adaptive control voltage. As the input voltage $e_i$ increases from zero, the output $e_o$ first remains constant. When $e_i$ reaches a designated value $e_{o1}$, the voltage $e_o$ begins to increase. This voltage when coupled into signal divider 140 results in a reduction of the output 20 Hz sine wave from the signal divider 140 on lead 150. Consequently, the automatic gain scan amplitude decreases. This operation continues until a maximum voltage $e_{o2}$ for $e_o$ is reached, at which time the amplitude of the gain control scan is held constant.

The output $e_i$ of the signal adder 58 and the output $e_o$ of the limiter 65 are summed in a signal adder 60. This addition process provides a control signal to automatic gain control amplifier 55 whose output exercises control over the voltage variable i.f. attenuator 18. This provides the necessary correction in the gain of the gain control loop corresponding to the reduction of the automatic gain control scan amplitude, thus keeping the calibrated loop gain constant. The output of signal adder 60 is amplified by amplifier 55 and drives the voltage-controlled attenuator 18 so as to reduce the error voltage from the signal adder 60, thus fulfilling the operation of the automatic gain control.

When the passive mode of the sensor is initiated, the high frequency oscillator 17 is switched from its modulation oscillator 24 to a fixed voltage from supply 25 which fixes the radio frequency output. Consequently, the energy reflected from target 5 is mixed with the local oscillator power to produce a zero difference frequency not passed through the i.f. channel of the receiver. Then, the receiver functions as a conventional passive radiometer; however, it accepts natural target radiation from the upper and lower radio frequency side bands with respect to the local oscillator frequency. The phase of the return from target 5 is inverted from the active mode. This is corrected by the inverting amplifier 98 as previously described. The operation of the automatic gain control is the same as for the active mode and the system automatically recycles to the proper gain control level at the shift from active to passive modes or vice versa.

A signal loss detector 45 is incorporated as an additional feature which senses the automatic gain control voltage. Should the target return disappear and the gain control voltage on lead 30 drop to zero, the signal loss detector 45 senses the drop out and supplies a signal to the conventional memory detector 46 which opens by linkage 47 the input switches 156, 158 to the respective tracking loop integrators 153, 157. This event allows the seeker to maintain heading until the target signal reappears, at which time the gain control signal reappears and memory circuit 46 returns switches 156, 158 to the track position T. It will be understood by those skilled in the art that switches 22, 80, 81, 94, 156, 158 may be manually or automatically operated, as desired, and that they may be semiconductor switches rather than mechanical switches or electrical relays.

It will be apparent to those skilled in the art that the novel adaptive automatic gain control of the present invention has several novel features overcoming the difficulties of the prior art. Two adaptive control features are incorporated in the automatic gain control system; a phase tracking automatic gain control detector and automatic gain scan amplitude control. With the first feature, a phase-locked loop is used to keep the gain control scan reference signal synchronized with the gain control video signal. The advantage is that the automatic gain control detector is always phase-locked and the maximum automatic gain control signal-to-noise voltage ratio is produced. The automatic gain control is therefore unaffected by circuit phase drifts such as changes in phase of the antenna automatic gain scan with time and temperature.

In the second feature, automatic gain scan control is incorporated to reduce the scan amplitude as target range closes. The advantage is that the seeker angular pointing error is reduced during terminal tracking. A penalty of the technique is that the tracking accuracy is degraded slightly because of automatic gain control scan feed through into the tracking loop. However, this is compensated by the adaptive automatic gain control scan feature. As target range closes, the amplitude of the antenna automatic gain control scan is decreased in inverse proportionality to the increase in the automatic gain control video signal. To maintain constant gain control loop gain the gain control reference (the gain control d.c. reference) is increased in proportion to the increase in the automatic gain control signal.

Another beneficial feature of the invention lies in the combined fundamental frequency and second harmonic operation of the demodulators. The addition of second harmonic demodulation provides a more uniform automatic gain control signal over the limits imposed by the antenna conical scan and thus increases the seeker tracking angular limits beyond those achievable with only fundamental frequency scan demodulation. The fundamental freqency component becomes very samll when the antenna boresight is a half-pattern width off of the target line of sight where, in present systems, tracking performance becomes unstable. The second harmonic component, however, is maximum when the boresight is a half-pattern width away from the target; when its effect is added to that of the fundamental component, a more uniform automatic gain control voltage is produced and significantly increased angular tracking capability is obtained. Simplicity of the radio frequency and intermediate circuits is retained, though both signal-to-receiver noise ratio and automatic gain signal-to-receiver noise ratio are improved, the received signal not being interrupted but being continuously received.

The novel automatic gain control system is driven from a master clock so that the tortal system is frequency locked. A 400 Hz reference oscillator is used to synchronize the power supply which provides power to the synchronous 400 Hz conical scan motor. The output of the reference oscillator is also divided to generate the 20 Hz signal that provides the gain control gimbal scan motion. Thus, the gain control scan frequency is an exact subharmonic of the conical scan frequency and no random beat frequences are produced in the receiver. An odd as opposed to an even subharmonic frequency is chosen to provide maximum rejection of cross-talk between the quadrature tracking error signals and the automatic gain control signal.

While the invention has been described in its preferred embodiments, it is to be understood that the words which have been used are words of description rather than of limitation and that changes within the purview of the appended claims may be made without departing from the true scope and spirit of the invention in its broader aspects.

We claim:

1. High frequency radiometric target tracking apparatus of the kind including conically-scanned gimbal-mounted antenna means, radiometric receiver means responsive to said antenna means, target tracking servo loop means responsive to said radiometric receiver means for positioning said antenna means about first and second axes, said target tracking apparatus additionally including:
   system clock means,
   conical scan motive means responsive to said system clock means, first demodulator means responsive to said radiometric receiver means and to said conical scan motive means, integrator means responsive to said first demodulator means, servo means responsive to said integrator means for positioning said gimbal-mounted antenna means about at least said first axis, automatic gain control signal generator means additionally responsive to said first demodulator means, frequency divider means additionally responsive to said system clock means for producing a first frequency signal, signal amplitude divider means responsive to said frequency divider means and to said automatic gain control means for producing a quotient output, and first signal adder means in series relation with said integrator means and said servo means and responsive to said signal amplitude divider means for supplying a combined output for control of said servo means.

2. Apparatus as described in claim 1 further including limiter means coupled in series relation between said automatic gain control signal generator means and said signal amplitude divider means.

3. Apparatus as described in claim 2 further including at least one variable gain stage coupled in series relation within said radiometric receiver means and responsive to said limiter means.

4. Apparatus as described in claim 3 wheerein said variable gain stage is a voltage variable attenuator stage.

5. Apparatus as described in claim 3 wherein said automatic gain control signal generator means comprises at least:

second demodulator means responsive to said first demodulator means and to said first frequency signal, and first absolute valve detector means responsive to said second demodulator means.

6. Apparatus as described in claim 5 wherein said automatic gain control signal generator means additionally includes:

third demodulator means responsive to said first demodulator means and to a harmonic of said first frequency signal, second absolute value detector means responsive to said third demodulator means, and second signal adder means responsive to said first and second absolute value detector means, said limiter means being responsive to said second signal adder means.

7. Apparatus as described in claim 6 additionally including: third signal adder means, said third signal adder means being responsive to said second signal adder means and to said limiter means.

8. Apparatus as described in claim 6 additionally including:

phase-locked loop means responsive to said first demodulator means for providing a fixed frequency output corresponding to said first frequency signal, said phase-locked loop means including voltage controlled phase-shifter means responsive to said first frequency signal for controlling the phase of said fixed frequency output, said third demodulator means being responsive to said phase-locked loop means.

9. Apparatus as dedscribed in claim 8 further including a substantially 90° phase-shifter coupled in series relation between said phase-locked loop means and said third demodulator means.

10. Apparatus as described in claim 8 further including frequency doubler means coupled between said phase-locked loop means and said second demodulator means.

11. Apparatus as described in claim 1 further including:

switch means in series relation with said first demodulator means and said integrator means, and signal loss detector means responsive to said automatic gain control signal generator for rendering said switch means non-conducting when the output of said automatic gain control signal generator means falls below a predetermined value.

* * * * *